United States Patent [19]
Chandos et al.

[11] Patent Number: 5,561,838
[45] Date of Patent: Oct. 1, 1996

[54] METHOD AND APPARATUS FOR SATELLITE HANDOFF PARAMETERS PREDICTION IN AN ORBITING COMMUNICATIONS SYSTEM

[75] Inventors: Ronald V. Chandos, Tempe; Daniel R. Tayloe, Phoenix, both of Ariz.

[73] Assignee: Motorola, Inc., Schaumburg, Ill.

[21] Appl. No.: 270,969

[22] Filed: Jul. 1, 1994

[51] Int. Cl.$^6$ .................................................. H04B 7/185
[52] U.S. Cl. ........................ 455/13.1; 455/13.2; 455/12.1
[58] Field of Search .................................. 342/357, 352, 342/418; 455/12.1, 11.1, 13.1, 13.2, 13.3, 13.4, 17, 33.1, 33.2, 53.1, 54.1, 54.2, 56.1, 62, 67.1, 67.6

[56] References Cited

U.S. PATENT DOCUMENTS

| | | | |
|---|---|---|---|
| 3,340,531 | 9/1967 | Kefalas et al. | 455/13.1 |
| 3,349,398 | 10/1967 | Werth | 455/13.1 |
| 4,667,203 | 5/1987 | Counselman, III | 342/418 |
| 5,095,538 | 3/1992 | Durborow, III | 455/71 |
| 5,161,248 | 11/1992 | Bertiger et al. | 455/33.2 |
| 5,187,805 | 2/1993 | Bertiger et al. | 455/12.1 |
| 5,303,286 | 4/1994 | Wiedeman | 455/13.1 |
| 5,367,304 | 11/1994 | Jan et al. | 455/13.1 |
| 5,412,388 | 5/1995 | Attword | 342/357 |
| 5,412,389 | 5/1995 | Olds | 342/357 |
| 5,423,084 | 6/1995 | Vatt | 455/13.1 |

OTHER PUBLICATIONS

Steve Moritz, Handoff Design Considerations for the IRIDIUM™ System, Special Issue on Mobile Sattelite Communications, Nov. 1991.

IRIDIUM Ground Segments, Special Issue on Mobile Satellite Communications, Nov. 1991.

*Primary Examiner*—Reinhard J. Eisenzopf
*Assistant Examiner*—Marsha D. Banks-Harold
*Attorney, Agent, or Firm*—Kevin K. Johanson

[57] ABSTRACT

A satellite cellular communications network performs cell-to-cell handoffs between cells of different satellites (30, 32). Inter-satellite handoffs require resynchronization to the prospective propagation timing and Doppler frequency parameters of the prospective satellite. Calculation of these parameters prior to transitioning to the prospective satellite minimizes interruptions to communications. Subscriber units (24) perform handoff parameter calculations while on narrow band communications channels without occupying broadband shared acquisition resources.

19 Claims, 4 Drawing Sheets

METHOD AND APPARATUS FOR SATELLITE HANDOFF PARAMETERS PREDICTION IN AN ORBITING COMMUNICATIONS SYSTEM

RELATED INVENTION

The present invention is related to the following invention which is assigned to the same assignee as the present invention:

"Satellite Cellular Communication Methods For Performing Cell-To-Cell Handoff", filed Jun. 1, 1994 having Ser. No. 08/252,472.

TECHNICAL FIELD

This invention relates generally to satellite cellular communications systems and, in particular, to a method for calculating handoff parameters necessary for performing cell to cell handoffs between cells of different satellites.

BACKGROUND OF THE INVENTION

A cellular communication system projects a number of cells onto the earth. A frequency spectrum is then allocated in frequency, in time, by coding, or a combination of these, to the cells so that communications taking place in nearby cells use different channels to minimize the chances of interference. On the other hand, communications taking place in cells located far apart may use the same channels, and the large distance between communications in common channels prevents interference. Over a large pattern of cells, a frequency spectrum is reused as much as possible by distributing common channels over the entire pattern so that only far apart cells reuse the same spectrum. An efficient use of spectrum results without interference.

One problem which cellular communications systems address is the handing-off of communications between cells, particularly between cells of different satellites. Relative movement between end users and cells causes the end users and the communication links directed thereto to move between cells. In order to permit continuous communications in an ongoing call, the system must "handoff" the call when the end user crosses a cell boundary. If a call is not handed off to a new cell upon leaving an old cell, the call will eventually be lost because the strength of signals over which communications take place would diminish to a point where the system's radio equipment cannot receive the end user's transmissions, or vice versa.

Conventional terrestrial cellular handoff techniques may work adequately when the distances between subscriber units and system transceivers are relatively small, when speeds of movement between cells and subscriber units are slow, and when handoffs are relatively evenly distributed in time. Such conditions are present for conventional terrestrial cellular systems in which cells do not significantly move with respect to the earth and the movement between cells and subscriber units results from subscriber movement in accordance with conventional modes of transportation. On the other hand, when system radio equipment is located on satellites orbiting the earth in moving orbits, these conditions are not present, and the conventional handoff techniques may be inadequate.

For example, orbiting satellites are located a relatively large distance from subscriber units, often on the order of several hundred kilometers. The smaller this distance, the greater the speed of the satellite relative to a particular position on the earth. Speeds of over 20,000 km/hr are typical. This fast movement relative to a subscriber unit introduces widely and rapidly varying propagation delays and Doppler frequency offsets into signals transmitted between a satellite and a subscriber unit. The widely and rapidly varying propagation delays and Doppler frequency offsets make handoffs involving different satellites more complex and time consuming. The resynchronization process required to generate accurate time delay parameters and Doppler frequency offset parameters compatible with the newly servicing satellite may be time consuming and complex.

Accordingly, there is a significant need for an inter-satellite handoff method and system, including a subscriber unit, which permit direct generation and calculation of handoff parameters, permitting an efficient handoff directly to a traffic channel of a new servicing satellite.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF A PREFERRED EMBODIMENT

Figure 1:
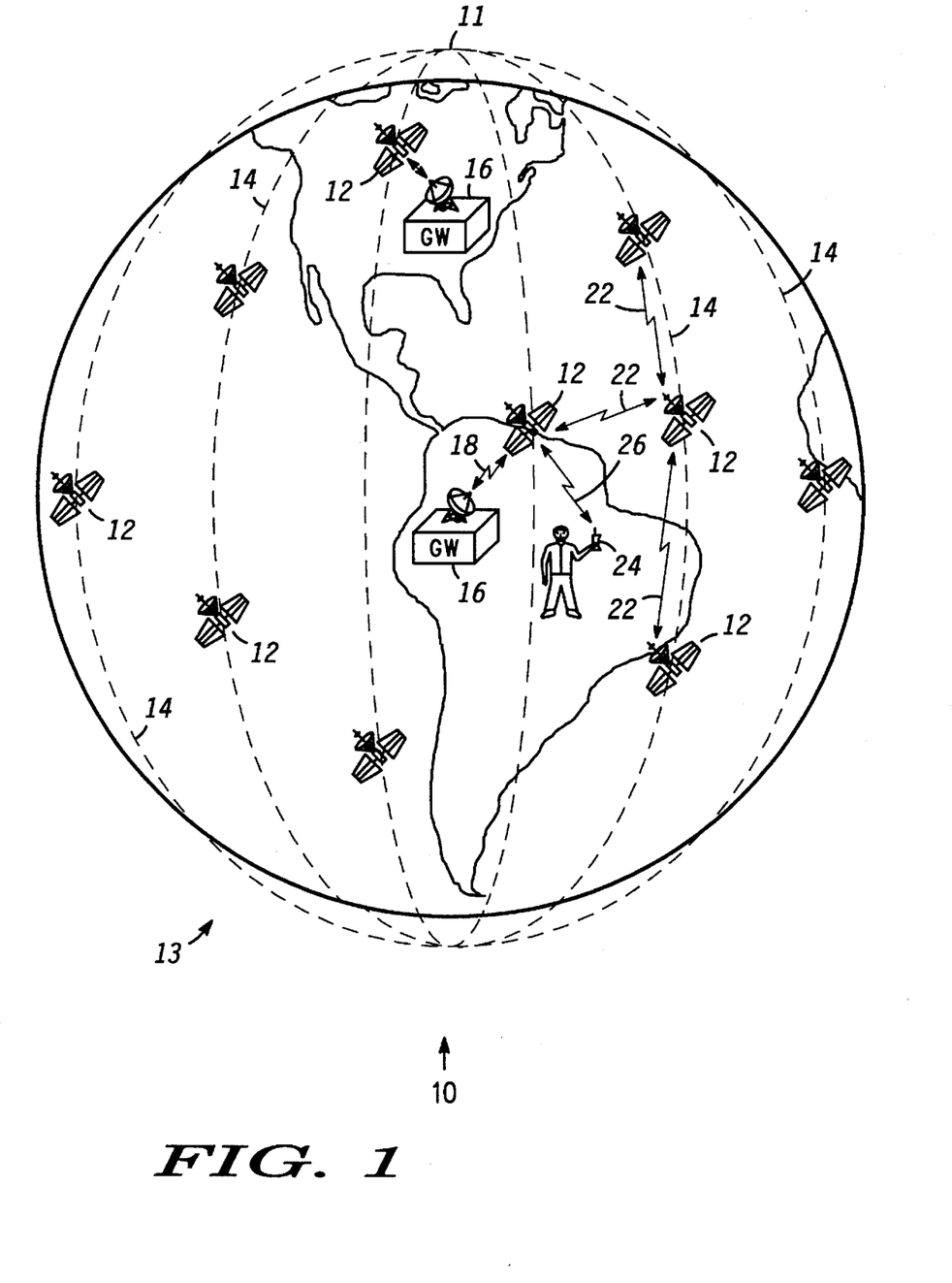
FIG. 1 shows a layout diagram of an environment which supports a cellular communications network within which the present invention may be practiced.

FIG. 1 shows a layout diagram of an environment 10 which supports a cellular communications network within which the present invention may be practiced and configured in accordance with a preferred embodiment of the present invention. A constellation 11 consisting of several satellites 12 is placed in a relatively low orbit around the earth.

Environment 10 additionally includes one or more gateways (GW) 16. Gateways 16 reside on the surface of the earth and are in data communication with nearby satellite(s) 12 through gateway link 18. Satellites 12 are also in communication with one another through cross-links 22. In order to synchronize communication and minimize interference, all satellites 12 are locked together in time through intervention of a ground based satellite control function. Thus, all satellites 12 in the constellation essentially run from a common clock.

Through constellation 11 of satellites 12, a gateway 16 may control communications delivered to any size region of the earth. However, the region controlled by each gateway 16 is preferably associated with one or more specific geopolitical jurisdictions. Gateway 16 couples to public switched telecommunication networks (PSTN), from which calls directed toward subscriber units of environment 10 may be received and to which calls placed by subscriber units of environment 10 may be sent.

Environment 10 also includes any number, potentially in the millions, of subscriber units (SUs) 24. SUs 24 may be configured as conventional mobile or portable radio communication equipment. Environment 10 accommodates the movement of SUs 24 anywhere within the confines of the earth, whether on or near the surface or in the atmosphere above the earth. However, nothing requires SUs 24 to move, and environment 10 operates satisfactorily if a portion of the entire population of SUs 24 remains stationary. SUs 24 are configured to receive communications from satellites 12 and to perform other functions which are discussed below. SUs 24 communicate with nearby satellites 12 through subscriber links 26. Subscriber links 26 consist of among other things broadcast channel(s), traffic uplink and downlink channels, and acquisition channels (see FIG. 3).

In general terms, environment 10 may be viewed as including a network 13 through which SUs 24 communicate. Network 13 is formed from constellation 11 of satellites 12 and gateway 16. Calls may be connected between two SUs 24, or between an SU 24 and a PSTN phone number. Generally speaking, each SU 24 engages in control communications (e.g., broadcast channel monitoring, acquisition, etc.) with a nearby gateway 16 through constellation 11 during call set-up. These control communications take place prior to forming a communication path between an SU 24 and another unit, which may be another SU 24 or a PSTN phone number. In particular, an SU 24 communicates with the gateway 16 via one or more satellites 12. This gateway 16 may be considered the servicing gateway for that particular SU 24.

Due to the low earth orbits, satellites 12 constantly move relative to the earth. If, for example, satellites 12 are placed in orbits which are around 780 km above the earth, then an overhead satellite 12 travels at a speed of around 25,000 km/hr with respect to a point on the surface of the earth. This allows a satellite 12 to be within view of a point on the surface of the earth for a maximum period of around nine minutes. Due to the relatively low orbits of satellites 12, line-of-sight electromagnetic transmissions from any one satellite cover a relatively small area of the earth at any point in time. For example, when satellites 12 occupy orbits at around 765 km above the earth, such transmissions cover areas around 4075 km in diameter.

With respect to one another, satellites 12 remain relatively stationary, except for orbits 14 converging and crossing over or intersecting each other in the polar regions. Due to this movement, the distances between satellites 12 that reside in common orbits 14 remain substantially constant. However, the distances between satellites 12 that reside in adjacent orbits 14, also called cross-plane orbits, vary with the latitudes of the satellites 12. The greatest distance between these cross-plane satellites 12 exists at the equator. This distance decreases as cross-plane satellites 12 approach the polar regions and increases as cross-plane satellites 12 approach the equator. Also, as this series of adjacent orbits wraps around the earth, a seam is formed between the first and last orbits in the series, wherein satellites in adjacent orbits travel in opposite directions.

Figure 2:
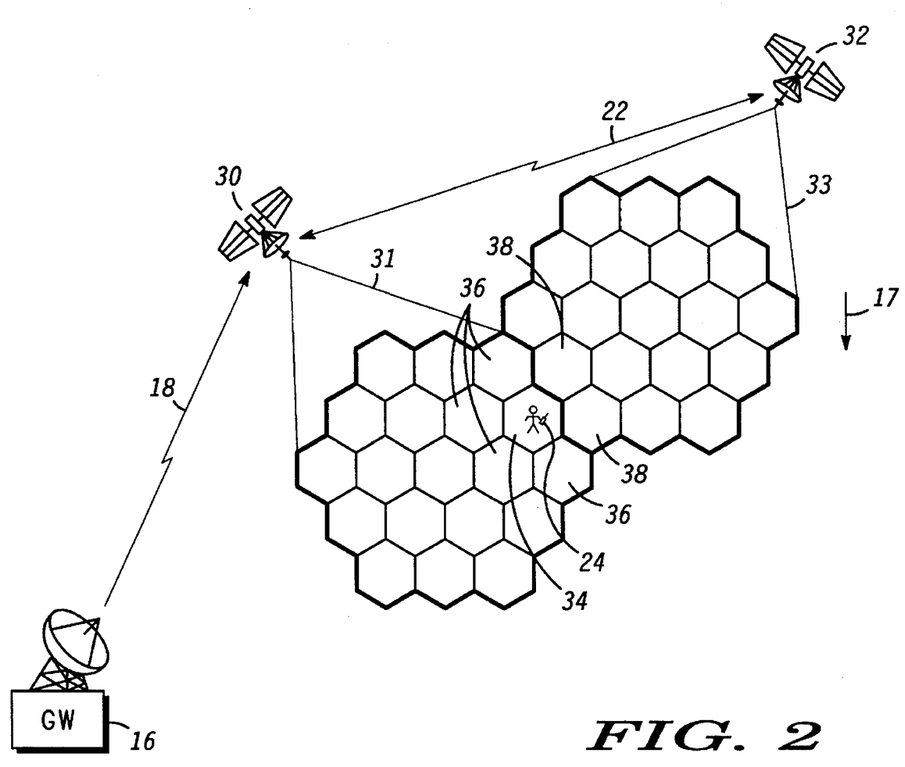
FIG. 2 shows a diagram of cellular patterns formed by adjacent satellites projecting communication beams upon the surface of the earth.

FIG. 2 shows a diagram of cellular patterns formed by adjacent satellites projecting communication beams upon the surface of the earth. Each satellite 12 includes an array (not shown) of directional antennas or a phased array antenna (also not shown) for projecting numerous discrete antenna patterns or cells on the earth's surface at numerous diverse angles away from a satellite 12. Cells are shown as hexagons for convenience only. Those of skill in the art understand that cells may be other shapes such as elliptical. The particular shape of the antenna pattern is not important for the present invention.

As shown in FIG. 2, a first satellite 30 and a second satellite 32 both orbit the earth while generating a first beam set projection 31 and a second beam set projection 33 containing multiple cells, respectively. Each beam set projection has both inner cells (i.e., cells having boundaries shared only by same satellite cells) and outer cells (i.e., cells having boundaries shared by cells of another satellite).

Cells projected upon SUs become the servicing cell 34 for SU 24 located within its boundaries. Servicing cell 34 provides communications between SU 24 and a first satellite 30. These communications may be on dedicated traffic channels if a call is established, or a general broadcast channel common to all SUs within servicing cell 34. The broadcast channel is continuously monitored by all SUs within that cell and conveys among other things, a beam identification. The traffic downlink channel conveys, among other things, a candidate handoff list of cells for SUs to consider in handoff decisions.

A gateway 16 directs communications from a PSTN user or other SUs to SU 24 through gateway link 18. Gateway link 18 carries not only communications for SUs serviced by satellite 30, but also communications for thousands of other SUs located within the view of several satellites 12 in constellation 11. Communications traffic on gateway link 18 is routed to other servicing satellites through inter-satellite cross-links 22.

As a first satellite 30 advances in orbital direction 17, so also will first beam set projection 31 advance in orbital direction 17. As servicing cell 34 advances past SU 24, a new cell must be selected to become the new servicing cell for SU 24. Candidate servicing cells may be cells located adjacent to servicing cell 34 such as intra-satellite adjacent cells 36 and inter-satellite adjacent cells 38. A list of candidate servicing cells is transmitted in a portion of the traffic downlink channel to SU 24 in servicing cell 34.

Intra-satellite adjacent cells 36 are projected from the same satellite and therefore have the same time delay and Doppler frequency offset parameters as did the servicing beam prior to handoff. Handoffs to these intra-satellite cells is therefore much simpler requiring SU 24 to transition to an available traffic channel used by the intra-satellite adjacent cell.

Inter-satellite adjacent cells 38 are projected from a different satellite than that currently servicing SU 24. If SU 24 selects an inter-satellite adjacent cell as its new servicing cell, then the differing distance to and the relative velocity of the new satellite 32 must be determined and used to determine new values for the time delay and Doppler frequency offset parameters used for compatible, non-interfering communications with satellite 32. The scope of the present invention includes the improved derivation and calculation of these inter-satellite handoff parameters.

Figure 3:
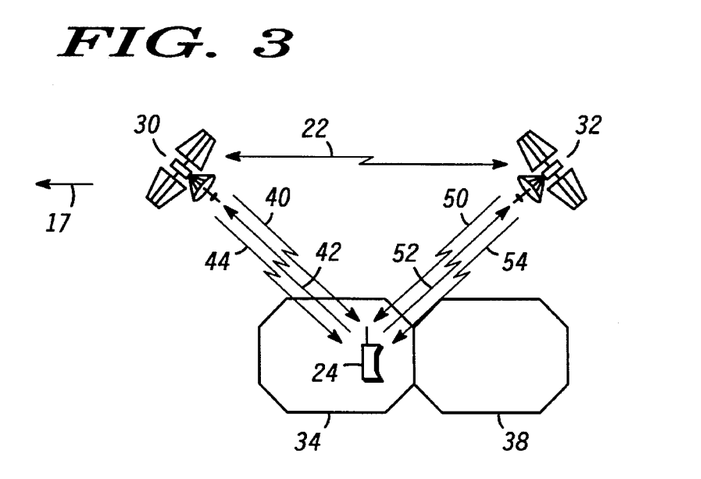
FIG. 3 shows a pictorial diagram of an inter-satellite handoff between adjacent satellites, in accordance with a preferred embodiment of the invention.

FIG. 3 shows a pictorial diagram of an inter-satellite handoff between adjacent satellites, in accordance with a preferred embodiment of the invention.

Due to the low earth orbits, satellites 30 and 32 constantly move relative to the earth in orbital direction 17. In a preferred embodiments, satellites 30 and 32 move in orbits at an altitude in the range of 500–1000 km above the earth. If, for example, satellites 30 and 32 are placed in orbits which are around 780 km above the earth, then an overhead satellite 30 and 32 travels at a speed of around 25,000 km/hr with respect to a point on the surface of the earth. Electromagnetic signals traveling at or near the speed of light between an SU 24 positioned near the surface of the earth and a satellite 30 or 32 in such an orbit, will require a propagation duration of 2–3 msec or more, depending on the satellite's position. Moreover, electromagnetic signals traveling between an SU 24 positioned near the surface of the earth and a satellite 30 or 32 in such an orbit may experience a considerable Doppler component of frequency shift, the precise value of which is dependent on a source frequency and the satellite's velocity.

As mentioned above, subscriber link 26 consists of, among other things, a broadcast channel 40 providing satellite 30 relevant information to an SU 24. Broadcast channel information includes the current satellites Nadir position (i.e., ground track location) and current time of day. Due to the synchronous nature of the constellation, the broadcast messages can be viewed as being launched into the network at nearly the same instant in time. In a preferred embodiment, the satellites are time synchronized to a precision of a few tens of microseconds.

To establish initial communications between SU 24 and satellite 30, an SU 24 must initially go through a closed loop range and Doppler correction procedure known as acquisition with a satellite 30. This insures that transmissions from SU 24 are received at a satellite 30 within the correct time/frequency window (see FIG. 4). In a preferred embodiment, this is accomplished by dedicating one or more acquisition channels to support this process.

Acquisition channels tolerate time and frequency errors better than narrower traffic uplink and downlink channels. In a typical prior art acquisition process, an SU 24 sends an acquisition request (not shown) on an acquisition channel. A satellite responds with an "early/late" time of arrival response, along with a "frequency high/low" response. The SU uses this information to adjust its transmit time advance offset and Doppler frequency offset and tries again. The process is repeated until the SU's timing and frequency are sufficiently accurate to accommodate non-interfering communications on traffic uplink and downlink channels.

However, this process consumes shared satellite resources (e.g., acquisition channel and satellite power) by requiring several closed-loop iterations to establish and refine timing and frequency parameters. Additionally, performing an acquisition process for inter-satellite handoffs introduces time delay in the SU's communications by postponing traffic channel communications while acquisition proceeds.

Upon completion of an acquisition process by an SU, two parameters necessary for communications with a satellite have been established: (i) a transmit time advance offset necessary for calculating when to initiate a transmission for proper arrival during a satellite's receive window (see FIG. 4), and (ii) a Doppler frequency offset for adjusting an SU's transmit frequency to accommodate the Doppler shift created by a satellite's velocity.

As shown in FIG. 3, satellites 30 and 32 advance in orbital direction 17. Satellite 30, currently providing communication service to SU 24, will ultimately set (i.e., advance over the horizon). SU 24 must handoff traffic information by breaking communications with satellite 30 and establishing communications with satellite 32. In a preferred embodiment, inter-satellite handoffs occur approximately every 5 minutes.

Since the distance and relative velocity of satellite 32 differs from satellite 30, handoffs require determining new transmit time advance offset and Doppler frequency offset parameters. The present invention provides a method of determining these parameters for inter-satellite handoffs without performing a complete acquisition process as in the prior art method described above.

As shown in FIG. 3, an SU 24 receives routed network communications on a traffic downlink channel 44 established with satellite 30 either through an acquisition process as described above or from a previous handoff process. SU 24 transmits communications to satellite 30 on a traffic uplink channel 42 also established with satellite 30.

In a preferred embodiment, an SU communicates over traffic uplink and downlink channels that are time division multiplexed burst channels wherein the SU transmits information in a burst during a specific time slot and receives information in a burst in yet a different time slot. This process repeats at a fixed period. Since the constellation is moving with respect to an SU, the SU must constantly correct the transmit burst timing and transmitter frequency to account for the path length change and Doppler shift.

The burst received on traffic downlink channel 44 contains a status portion informing SU 24 of the accuracy of its transmit time advance offset and Doppler frequency offset parameters. As path lengths change and Doppler shifts, SU 24 updates and refines its parameters using the status from this closed-loop process. SU 24 maintains an internal timer (FIG. 5) initiating proper transmission timing for timely arrival of a burst during a satellite's receive window. SU 24 also uses the internal timer to indicate when downlink bursts are expected and also for time-stamping broadcast channel transmissions (FIG. 6) necessary for handoff parameter calculation. Moreover, the absolute time difference between dispatching an uplink burst and receiving a downlink burst is a measure of the two-way range between an SU and a satellite. Therefore, an SU has sufficient information to determine the path delay to a satellite. SU 24 continuously monitors broadcast channel 40. Satellite 30 transmits information in broadcast channel 40 to all SUs within cell 34.

SU 24 monitors or attempts to monitor prospective handoff candidate broadcast channels such as broadcast channel 50. Those skilled in the art understand that this selection process may be random, sequential, power-level threshold driven or another selection process. SU 24 continues monitoring candidate handoff cells while maintaining communications on traffic uplink and downlink channels 42 and 44, respectively.

Transmission and reception characteristics of SU 24 with respect to satellites 30 and 32 change as these satellites continue in orbital direction 17. As satellite 30 advances, propagation attenuation or shadowing degrades channel link margins. On the other hand, as satellite 32 also advances, propagation characteristics of satellite 32 become more favorable to SU 24.

SU 24 determines from monitoring broadcast channels of prospective handoff candidates, that broadcast channel 50, common to cell 38, provides preferred propagation characteristics over broadcast channel 40, common to cell 34. SU 24 requests future communications be redirected through cell 38, as detailed in FIG. 6. Satellite 30 forwards this handoff request to gateway 16 (FIG. 2). Gateway 16 brokers the request for a resource (e.g., traffic channel) on satellite 32. Satellite 32 analyzes channel availability in cell 38 and returns a response to gateway 16. If satellite 32 grants resources to SU 24, then additional handshaking within network 13 may take place to facilitate the handoff process. If satellite 32 opposes the request, then other steps may be taken such as evaluating alternate candidate cells previously selected by SU 24 or requiring SU 24 to analyze remaining candidate handoff cells for an adequate alternate.

Figure 6:
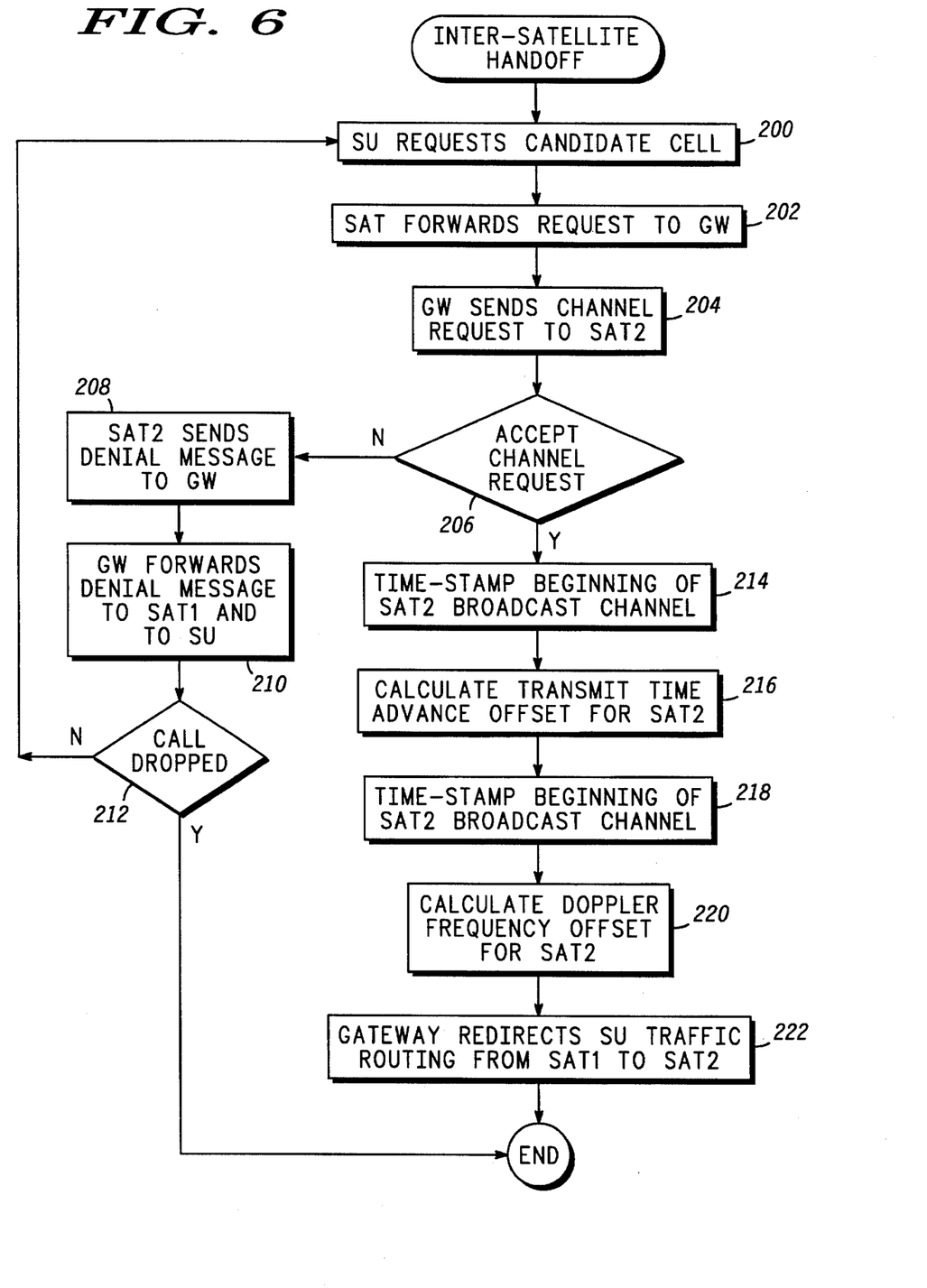
FIG. 6 shows a flowchart of an inter-satellite handoff method, in accordance with a preferred embodiment of the invention.

Upon successful allocation of necessary resources, SU 24 executes the additional steps as detailed in FIG. 6 to establish a traffic uplink channel 52 and a traffic downlink channel 54. Communications traffic is redirected through constellation 11 (FIG. 1) using cross-links 22. Traffic uplink and downlink channels 42 and 44 are made available for communications with a different SU.

Figure 4:
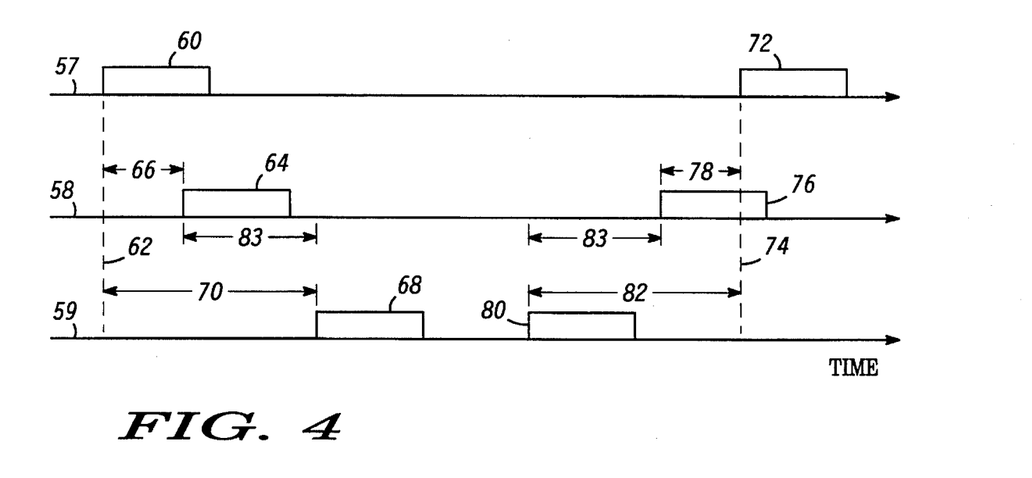
FIG. 4 shows a high-level timing-relational diagram of communications between a subscriber unit and a first and second satellite, in accordance with a preferred embodiment of the invention.

FIG. 4 shows a high-level timing-relational diagram of communications between a subscriber unit and a first and second satellite, in accordance with a preferred embodiment of the invention.

All satellites 12 of constellation 11 (FIG. 1) are time synchronized to transmit simultaneously and to receive simultaneously. A satellite communication time-line 57 applies to all satellites 12 in constellation 11 and shows satellite 12 transmissions during satellite transmission burst 60 and reception during satellite receive window 72. This process periodically repeats with a preferred embodiment period being approximately 90 msec. Synchronizing all transmissions prevents self jamming and adjacent interference from neighboring satellites. Satellite transmission burst 60 may occur on multiple frequencies or channels such as traffic downlink channels, acquisition channels, broadcast channels, or others. Also, SUs 24 know the periodicity of transmit and receive bursts.

An SU-with-first-satellite-time-line 58 illustrates the transmission and reception time-line at SU 24 with respect to a first satellite 30. SU 24 receives transmission burst 60 from satellite 30 shown as received first satellite transmission burst 64 delayed in time by a first satellite propagation delay 66. Propagation delay 66 is measured in FIG. 4 from the beginning of satellite transmission burst 62.

SU 24 also receives a satellite transmission burst 60 from satellite 32 shown as a received second satellite transmission burst 68 delayed in time by a second satellite propagation delay 70. Propagation delay 70 is measured in FIG. 4 from the beginning of satellite transmission burst 62 and as shown in an SU-with-second-satellite-time-line 59.

A satellite receive window 72 defines a receive interval wherein all satellites 12 of constellation 11 are accepting transmissions from throughout network 13 (FIG. 1). In order for transmissions from SU 24 to timely arrive at satellites 30 and 32, they must be time-advanced a value of two times the propagation delay to accommodate signal propagation time delay.

As shown in an SU-with-first-satellite-time-line 58, SU 24 employs a first-satellite-transmit-time-advance-offset 78, measured from beginning of satellite receive interval 74, to an SU-to-first-satellite-transmission burst 76. This "early transmission" assures sufficient time for electromagnetic propagation to satellite 30. An SU-with-second-satellite-time-line 59, SU 24 employs a second-satellite- transmit-time-advance-offset 82 to an SU-to-second-satellite-transmission burst 80.

As is shown in FIG. 4, when a subscriber unit transitions (i.e., hands-off) to another satellite, it must accurately adjust its time advance by differential 83 to meet the precise timing associated with satellite receive window 72. Derivation of differential 83 is discussed in FIG. 6. The subscriber unit must also precisely adjust its transmit frequency and incorporate a Doppler frequency offset associated with the location of a subsequent satellite.

Figure 5:
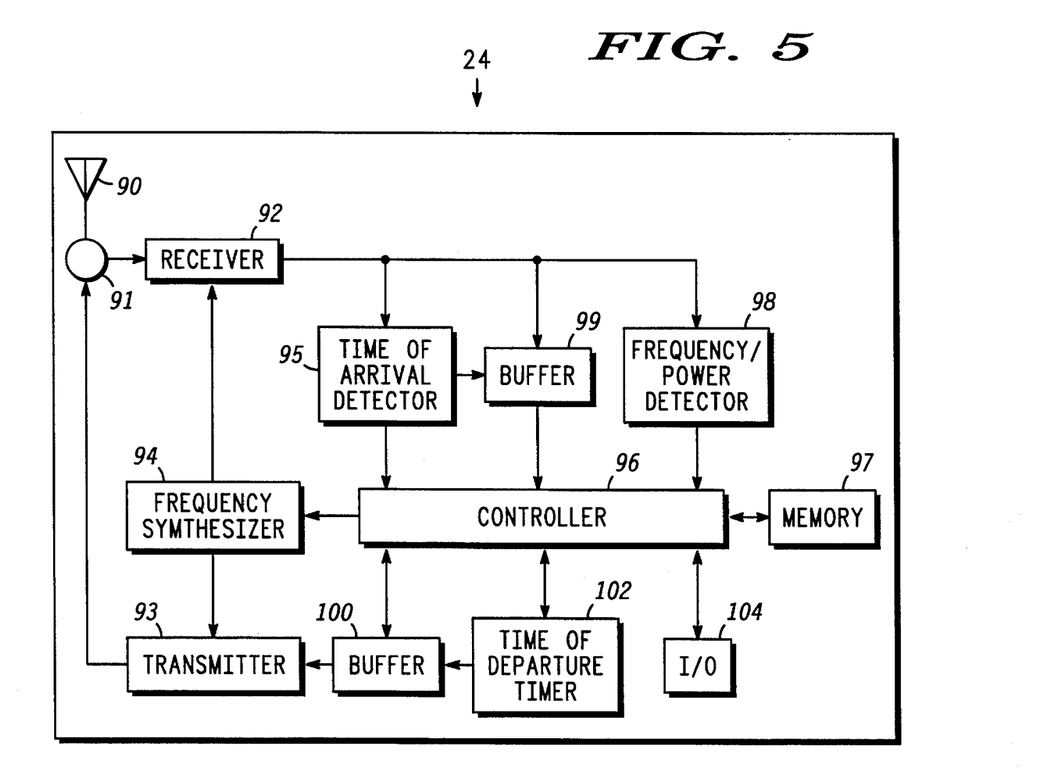
FIG. 5 shows a block diagram of the subscriber unit portion of the communications system.

FIG. 5 shows a block diagram of the subscriber unit portion of the communications system. SU 24 includes one or more receivers 92. Receiver 92 receives signals from channels 40, 44, and 50 (see FIG. 3). While an SU 24 may include only a single receiver 92, a satellite 12 includes many receivers for simultaneously communicating over numerous different ones of channels 42, and 52 (see FIG. 3). Receiver 92 couples to a receive buffer 99, which temporarily stores data received at receiver 92 until these data can be processed. Receiver 92 also couples to a time of arrival detector 95 and a frequency/power detector 98.

Time of arrival detector 95 identifies the point in time when a burst of baseband data are initially received at SU 24 or an offset between expected and actual points in time for receiving a burst of data. Detector 95 couples to buffer 99 so that data may be correctly docked into buffer 99 as they are received. Detector 95 may be implemented in a conventional manner. For example, detector 95 may over-sample incoming data and declare a time of arrival to be the point in time where sampled data exhibits a maximum amplitude. Alternatively, detector 95 may correlate input baseband samples with the conjugate of a complex local reference running at a frequency equal to twice the symbol rate. This correlation produces a correction term that describes the phase difference between the input signal and local reference. The phase difference can then be integrated over an entire burst and scaled to provide timing offset measurements.

Frequency/power detector 98 measures a frequency associated with baseband data. Baseband data may be associated with a residual IF frequency due to Doppler and errors in precisely modulating and demodulating baseband data. Detector 98 may be implemented in a conventional manner. For example, a maximum-likelihood phase estimator, a Fast Fourier Transform (FFT) signal processor, or other form of frequency detection may be used. Detector 98 also measures received power levels for monitoring handoff candidates.

Buffer 99, time of arrival detector 95, and detector 98 all couple to a controller 96. Controller 96 also couples to a frequency synthesizer 94 to control receive and transmission frequencies. Synthesizer 94 provides a local oscillator signal to receiver 92. Receiver 92 generates a baseband signal which exhibits a frequency approximately equal to the difference between a received signal and the local oscillator signal.

Controller 96 additionally couples to a time of departure timer 102, a memory 97, and transmit buffer 100. Controller 96 uses timer 102 to help monitor real time by maintaining the current date and time. In addition, timer 102 helps detect precise points in time (e.g., transmit time advance offset 78 and 82) for transmitting data from SU 24. Transmit buffer 100 temporarily stores data placed therein by controller 96. Transmit buffer 100 couples to transmitter 93, and synthesizer 94 provides a local oscillator signal which transmitter 93 uses in modulating baseband data to RF. Receiver 92 and transmitter 93 couple through a signal splitter 91 to antenna 90. Timer 102 couples to transmit buffer 100 to specify when data are to be clocked from buffer 100 for transmission through transmitter 93, signal splitter 91, and antenna 90.

Memory 97 includes data which serve as instructions to controller 96 and which, when executed by controller 96, cause SU 24 to carry out processes that are discussed below. In addition, memory 97 includes variables, tables, offsets, and databases that are manipulated due to the operation of SU 24.

In SU 24, controller 96 also couples to an I/O section 104. In an SU 24, I/O section 104 may include microphones, speakers, digitizers, vocoders, decoders, and the like, to convert between audio and digitized packets that are compatible with network 13 (see FIG. 1). Likewise, I/O section 104 may include a keypad for controlling the operation of SU 24 by a user.

FIG. 6 shows a flowchart of an inter-satellite handoff method, in accordance with a preferred embodiment of the invention. The method is used when the current satellite sets and a new satellite comes into view or when sufficient shadowing of a current satellite occurs and a different satellite offers favorable propagation characteristics. In other words, SU 24 must transfer its communications to the new satellite or the call will be dropped. This process is called inter-satellite handoff and in a preferred embodiment occurs on the average, approximately every five minutes during a telephone call.

The flowchart in FIG. 6 details the method of handing-off a call of SU 24 from current cell 34 of first satellite 30, to candidate cell 38 of second satellite 32 (FIG. 2). First satellite 30 and second satellite 32 project respectively the current cell 34 and candidate cell 38 onto the earth. It is desirable to establish communications with the new satellite with minimal disruption of actual user traffic. This can be done by exploiting the fact that satellite 30 and satellite 32 are synchronized in time.

As mentioned earlier, SU 24 receives a handoff candidate list by "listening" to a traffic downlink channel 44 unique to SU 24 as transmitted by satellite 30 (FIG. 3). SU 24 in turn scrutinizes candidate handoff cells and upon surpassing a handoff threshold, a task 200 requests a handoff to one or more adequate candidate cells. As described above, choosing one of the cells is based on a variety of factors including channel availability and capacity information as indicated by the handoff candidate list and local channel quality determined by SU 24.

Once SU 24 determines in task 200 what candidate cell(s) it wants to transfer its communication to, SU 24 sends a handoff request to satellite 30 which forwards it in task 202 to gateway 16. Forwarding the handoff request may involve transmitting the handoff request through a network of satellites 12 so that it reaches a satellite 12 which is connected to gateway 16 via gateway link 18 (FIG. 2). After gateway 16 receives the handoff request, gateway 16 sends in task 204 a channel request to satellite 32 to request and reserve, if available, a candidate traffic channel in cell 38 of satellite 32.

In task 206, satellite 32 determines whether to accept or deny the traffic channel request. If satellite 32 denies the traffic channel request of all candidate channels, satellite 32 sends a denial message to gateway 16 in task 208. Gateway 16 forwards in task 210 the denial to satellite 30 which is transmitted to SU 24. If SU 24 has enough time to select another candidate cell before the call is dropped in task 212, SU 24 returns to task 200 to select and request other candidate cell(s) from the handoff candidate list or SU 24 may repeat the original request after waiting a predetermined period of time. Otherwise, the call is dropped and the inter-satellite method ends.

If satellite 32 accepts the traffic channel request in task 206, then new handoff parameters, transmit time advance offset and Doppler frequency offset, for satellite 32 must be calculated. Prior art approaches for deriving these handoff parameters have implemented an acquisition process as previously described.

In a preferred embodiment of the present invention, handoff parameters, transmit time advance offset and Doppler frequency offset, are calculated with sufficient precision by SU 24 to enable SU 24 to handoff directly to traffic uplink channel 52 and downlink channel 54 in cell 38, bypassing the acquisition process used in the prior art method and system.

A task 214 samples broadcast channel 50 and time-stamps its arrival time at SU 24, also shown in FIG. 4 as second satellite propagation delay 70. The time-stamp may be referenced from the time at which the burst form satellite 30 was received or any other suitable reference point. This time-stamp is simply used to calculate a differential 83 (FIG. 4) of existing timing information within SU 24.

If SU 24 determines the time offset between reception of satellite 32 and satellite 30 broadcast bursts, SU 24 has a fairly accurate indication of the path length difference between the two satellites. Since SU 24 is in active communications with satellite 30, it also knows the time offset between satellite transmission burst 60 (FIG. 4) and reception to satellite 30 time window also shown in FIG. 4 as a first satellite propagation delay 66.

A task 216 in SU 24 calculates a second-satellite-transmit-time-advance-offset 82 (FIG. 4) combining differential 83 (FIG. 4) as derived from the time-stamp of broadcast channel 50 from satellite 32 as performed in task 214, with first-satellite-transmit-time-advance-offset 78 (FIG. 4) which has been continuously used and kept current in transmissions with satellite 30. This calculation extracts any additional time delay due to periodic sampling of subsequent frames to yield a differential 83. If SU 24 changes its first-satellite-transmit-time-advance-offset 78 by a differential 83 as determined by broadcast channel monitoring of satellites 30 and 32, SU 24 should be able to hit satellite window 72 for communicating with satellite 32 without going through a full trial and error closed-loop acquisition procedure as discussed above.

In addition to time corrections, the SU must adjust the transmission frequency to correct for the Doppler frequency shift caused by the satellite's motion. A task 218 again samples broadcast channel 50 and time-stamps its arrival time at SU 24. As noted in task 214 above, the time stamp may reference any consistent suitable reference point, as the time-stamps are used to calculate a time differential. The time-stamping process may repeat on one or more successive bursts or frames.

A task 220 calculates a current Doppler correction frequency for satellite 32. The time-stamp value of task 214 is subtracted from the time-stamp value of task 218. A quotient is calculated by dividing the above difference by the transpired burst interval between transmission from satellite 32 of the burst as time-stamped in a task 214 and the transmission from satellite 32 of the burst as time-stamped in a task 218. This transpired burst interval denominator is a multiple of the transmission period of satellite 32. The quotient is then multiplied by the nominal transmit frequency of broadcast channel 50. This product becomes the new Doppler frequency offset for traffic uplink channel 52 and traffic downlink channel 54.

It should be noted that task 216 could occur any time after task 214 and task 220 could occur any time after task 218. Task 218 is optional if previously stored time-stamps are used.

A task 222 routes future communication for SU 24 through network paths for delivery to SU 24 via satellite 32. The inter-satellite handoff is then complete. The calculated transmit timing advance and the Doppler correction frequency parameters are then refined in closed-loop status information exchanges as discussed above.

It will be appreciated that the present invention therefore provides an apparatus and method of handoff parameter calculation in a communications system which is significantly more time efficient than handoff parameter calculations requiring use of a separate acquisition channel.

Furthermore, it will be apparent to those skilled in the art that the disclosed invention may be modified in numerous ways and may assume many embodiments other than a preferred form specifically set out and described above.

Accordingly, it is intended by the appended claims to cover all modifications of the invention which fall within the true spirit and scope of the invention.

What is claimed is:

1. A method of calculating handoff parameters for handing-off communications with a subscriber unit (SU) from a first satellite to a second satellite in a satellite communications system, said method comprising the steps of:
   (a) monitoring at least one transmission of said second satellite;
   (b) time-stamping reception of said at least one transmission; and
   (c) calculating said handoff parameters for said second satellite, said handoff parameters Comprising a transmit time advance offset and a Doppler frequency offset for said second satellite.

2. A method as recited in claim 1, wherein said at least one transmission occurs on a broadcast channel.

3. A method as recited in claim 1, wherein step (b) comprises the steps of:
   (b1) referencing arrival of a first one of said at least one transmission with a timer;
   (b2) determining a first time-stamp from said timer;
   (b3) storing said first time-stamp;
   (b4) referencing arrival of a second one of said at least one transmission with said timer;
   (b5) determining a second time-stamp from said timer; and
   (b6) storing said second time-stamp.

4. A method as recited in claim 1, wherein said at least one transmission of said first satellite and said second satellite are synchronized in time.

5. A method of calculating handoff parameters for handing-off communications with a subscriber unit (SU) from a first satellite to a second satellite in a satellite communications system, comprising the steps of:
   (a) monitoring a broadcast channel of said second satellite;
   (b) generating a first time-stamp of the arrival of a first broadcast channel transmission from said second satellite;
   (c) comparing said first time-stamp with a first satellite transmit time advance offset;
   (d) calculating a second satellite transmit time advance offset;
   (e) monitoring said broadcast channel of said second satellite;
   (f) generating a second time-stamp of the arrival of a second broadcast channel transmission from said second satellite;
   (g) storing a transpired burst interval between said first broadcast channel transmission and said second broadcast channel transmission; and
   (h) calculating a second satellite Doppler frequency offset.

6. A method as recited in claim 5, wherein step (h) comprises the steps of:
   (h1) calculating a difference by subtracting said first time-stamp from said second time-stamp;
   (h2) calculating a quotient by dividing said difference with said transpired burst interval; and
   (h3) calculating said second satellite Doppler frequency offset by multiplying said quotient with a nominal communication frequency from said second satellite.

7. A method of handing-off communications with a subscriber unit from a first satellite projecting a current servicing cell to a second satellite projecting a plurality of inter-satellite adjacent cells, comprising the steps of:
   (a) initiating a handoff request from said first satellite to a candidate cell;
   (b) granting said handoff request to said subscriber unit;
   (c) calculating handoff parameters comprising a second satellite transmit time advance offset and a second satellite Doppler frequency offset for said second satellite; and
   (d) transitioning said communications with said subscriber unit through one of said inter-satellite adjacent cells of said second satellite.

8. A method as recited in claim 7, wherein step (a) comprises the steps of:
   (a1) transmitting a list comprising at least one inter-satellite adjacent candidate cell from said first satellite to said subscriber unit;
   (a2) analyzing said candidate cell for acceptable propagation characteristics; and
   (a3) selecting at least one of said candidate cells for said handoff request.

9. A method as recited in claim 8, wherein step (b) comprises the steps of:
   (b1) forwarding said handoff request containing at least one candidate cell from said first satellite to a gateway;
   (b2) forwarding said handoff request containing said candidate cell from said gateway to said second satellite;
   (b3) surveying availability of required resources for said handoff in said candidate cell of said second satellite;
   (b4) approving said handoff request at said second satellite;
   (b5) forwarding said approved handoff request from said second satellite to said gateway;
   (b6) forwarding said approved handoff request from said gateway to said first satellite; and
   (b7) forwarding said approved handoff request from said first satellite to said subscriber unit.

10. A method as recited in claim 7, wherein step (c) comprises the steps of:
    (c1) monitoring a broadcast channel of said second satellite;
    (c2) generating a first time-stamp of the arrival of a first broadcast channel transmission from said second satellite;
    (c3) comparing said first time-stamp with a first satellite transmit time advance offset;
    (c4) calculating said second satellite transmit time advance offset;
    (c5) monitoring said broadcast channel of said second satellite;

(c6) generating said second time-stamp of the arrival of a second broadcast channel transmission from said second satellite;

(c7) storing a transpired burst interval between said first broadcast channel transmission and said second broadcast channel transmission; and (c8) calculating a second satellite Doppler frequency offset.

11. A method as recited in claim 7, wherein step (d) comprises the steps of:

(d1) adjusting the initiation of transmission to said second satellite by using said transmit time advance offset; and (d2) adjusting the nominal transmitter frequency of said subscriber unit by said Doppler frequency offset as calculated for transmission to said second satellite.

12. A subscriber unit for calculating handoff parameters for handing-off communicating from a first satellite to a second satellite in a Satellite communications system, said handoff parameters comprising a transmit time advance offset and a Doppler frequency offset for said second satellite, said subscriber unit comprising:

(a) a receiver for monitoring satellite transmissions from said first satellite and said second satellite;

(b) a controller coupled to said receiver, said controller calculating handoff parameters;

(c) a first timer coupled to both said controller and said receiver, said timer being capable of generating a time-stamp measuring a time differential between a reference point and said satellite transmissions from said second satellite; and (d) a memory coupled to said controller, said memory storing said time-stamp, said time-stamp being used by said controller for calculation of said handoff parameters.

13. A subscriber unit as recited in claim 12, wherein said transmissions are broadcast channel transmissions.

14. A subscriber unit as recited in claim 12, wherein said first timer comprises:

(c1) means for referencing the arrival of a first transmission with said first timer;

(c2) means for determining a first time-stamp from said first timer;

(c3) means for referencing the arrival of a second transmission with said first timer; and (c4) means for determining a second time-stamp from said first timer.

15. A subscriber unit as recited in claim 12, wherein subscriber unit transmissions are received synchronously with satellite receive window of said satellites, said subscriber unit further comprising:

(a) a transmitter; and (b) a second timer coupled to said controller, said second timer generating a time of departure of said subscriber unit transmissions.

16. A satellite cellular communications system for determining handoff parameters for subscriber units providing continuous communications as satellites orbit the earth, said system comprising:

(a) a constellation of satellites comprising a first satellite and a second satellite, said satellites being capable of transmitting and receiving; and (b) a subscriber unit capable of handing-off communications from said first satellite to said second satellite by calculating handoff parameters compatible with said second satellite, said handoff parameters comprising a transmit time advance offset and a Doppler frequency offset.

17. A satellite cellular communications system as recited in claim 16, wherein transmissions of said first and said second satellites are synchronized in time.

18. A satellite cellular communications system for providing continuous communications services to subscribers as satellites orbit the earth, said system comprising:

(a) a constellation of satellites comprising a first satellite and a second satellite, said satellites being capable of transmitting and receiving;

(b) a gateway for forwarding a handoff request from said first satellite to said second satellite; and (c) a subscriber unit capable of handing-off communications from said first satellite to said second satellite by calculating handoff parameters compatible with said second satellite, said handoff parameters comprising a transmit time advance offset and a Doppler frequency offset for said second satellite.

19. A satellite cellular communications system as recited in claim 18, wherein transmissions of said first and said second satellites are synchronized in time.

\* \* \* \* \*